United States Patent Office 2,989,359
Patented June 20, 1961

2,989,359
PROCESS AND COMPOSITIONS FOR THE MANUFACTURE OF ICE COLORS IN TEXTILE PRINTING
Helmut Kleiner and Heinrich Gutjahr, Koln-Stammheim, Germany, assignors to Farbenfabriken Bayer Aktiengesellschaft, Leverkusen, Germany, a corporation of Germany
No Drawing. Filed Apr. 29, 1958, Ser. No. 731,640
Claims priority, application Germany May 4, 1957
4 Claims. (Cl. 8—45)

The present invention relates to a process and to compositions for the manufacture of ice colors in textile printing.

In accordance with the present invention it has been found that combinations of diazotized aminoazo compounds which are free from sulfonic acid and carboxylic acid groups, and 2-alkylamino-4(5)-sulfobenzoic acids are valuable diazoamino compounds which, when printed with ice color coupling components and developed in neutral steam, yield very deep and full prints on cotton, regenerated cellulose and various synthetic fibres. Despite the easy ability to split in neutral steam, the printing pastes show a very good keeping quality. Moreover, the prints do not show any visible decrease in depth of color when printed together with vat dyestuffs. It is also noteworthy that the diazoamino compounds used according to the invention are not inferior to the known diazoamino compounds with regard to their solubility, despite the larger molecule, nor with regard to their stability despite their easy ability to split at the temperature of the damping process. When using the same coupling components, they are superior to the known diazoamino compounds with regard to the depth of color of the prints obtained.

The diazoazo compounds to be used for the manufacture of the diazoamino compounds are preferably derived from the arylazo series, particularly from aminoazobenzene. They may have usual substituents such as halogen, nitro, alkyl, alkoxy, sulfone, sulfamide, carboxylamide, ester or other groupings, except sulfonic acid and carboxylic acid groups. Particularly suitable are compounds containing an alkoxy group in the o-position to the diazotizable amino group.

The prints obtainable according to the invention distinguish themselves by a good to very good fastness to light and an outstanding fastness to washing and boiling besides their particular depth of color. In addition to vat dyestuffs, they may also be used together with oxidation dyestuffs or pigment dyestuffs without impairing the valuable printing properties.

The following examples are given for the purpose of illustrating the invention without, however, limiting it thereto.

Example 1

60 to 100 parts by weight of a mixture of equivalent parts of a diazoamino compound obtainable from diazotized 4-amino-2,5-dimethoxybenzene-(1,1')-azo-2',6'-dichloro-4'-nitrobenzene and 2-ethylamino-5- or -4-sulfobenzoic acid, and of 2,3-hydroxy-naphthoyl-aminobenzene are pasted with 50 parts by weight of alcohol and dissolved in
100 parts by volume of water,
5 to 15 parts by weight of sodium hydroxide solution (38° Bé.) with the addition of
50 parts by weight of thiodiglycol or similar solvents based on glycol, and introduced into
500 parts by weight of a neutral starch-tragacanth thickening with the addition of
50 parts by weight of a neutral sodium chromate solution (1:2).

For prints on regenerated cellulose there are also added 100 parts by weight of urea. The mixture is made up with water to 1000 parts by weight.

The paste is printed onto the fibre, e.g., on cotton, regenerated cellulose or polyacrylonitrile fibre, the fabric is dried and then damped with neutral steam for 5 to 10 minutes, soaped by boiling, rinsed and dried. A deep navy blue is thus obtained of very good fastness to light and excellent fastness to wetting.

If instead of 2,3-hydroxynaphtholyaminobenzene there is used in the printing paste described above an equivalent amount of 1-(2',3'-hydroxynaphthoylamino)-2-methylbenzene, prints are obtained having a similar shade and equally good fastness properties.

When using equivalent amounts of 1,4-di-(acetoacetylamino)-tolidine as coupling component, reddish brown prints are obtained of good fastness to wetting.

The diazoamino compounds used in this example are obtainable by diazotizing 1 mol of 1-amino-2,6-dichloro-4-nitrobenzene in concentrated sulfuric acid with nitrosylsulfuric acid, combining the resulting diazo compound in an acid solution with 1 mol of 1-amino-2,5-dimethoxybenzene and further diazotizing without isolating the coupling product, and, finally, by reacting the separated diazoazo compound in a weakly alkaline medium with 2-ethylamino-5- or -4-sulfobenzoic acid. The precipitation of the diazoamino compound thus obtainable can be effected according to the process of German patent specification No. 950,292 by the addition of an excess of caustic alkalies and common salt. The diazoamino compounds are readily water-soluble reddish brown powders.

Example 2

60 to 100 parts by weight of a mixture of equivalent parts of a diazoamino compound obtainable from diazotized 4-amino-2,5-dimethoxybenzene-(1,1')-azo-2',6'-dichloro-4'-nitrobenzene and 2-methylamino-5- or -4-sulfobenzoic acid, and of 2,3-hydroxynaphthoylaminobenzene are pasted with 50 parts by weight of alcohol and dissolved in
100 parts by volume of water,
5 to 15 parts by weight of sodium hydroxide solution (38° Bé.) with the addition of
50 parts by weight of thiodiglycol or similar solvents based on glycol, and introduced into
500 parts by weight of a neutral starch-tragacanth thickening with the addition of
50 parts by weight of a neutral sodium chromate solution (1:2).

For printing of regenerate cellulose fibres there are also added 100 parts by weight of urea. The mixture is made up with water to 1000 parts by weight.

The paste is printed onto the fibre, the fabric is dried, damped with neutral steam for 5 to 10 minutes, boiled with soap, rinsed and dried. A deep navy blue is thus obtained of very good fastness to light and excellent fastness to wetting.

The diazoamino compounds may be produced similarly to the instructions given in Example 1. The products are reddish brown powders which readily dissolve in water.

Example 3

40 to 100 parts by weight of a mixture of equivalent parts of a diazoamino compound obtainable from diazotized 4-amino-2,5-dimethoxybenzene-(1,1')-azo-4'-nitrobenzene and 2-ethylamino-5-sulfobenzoic acid, and of 2,3-hydroxynaphthoylaminobenzene are pasted with 50 parts by weight of alcohol and dissolved in
100 parts by volume of water,
5 to 15 parts by weight of sodium hydroxide solution 38° Bé.) with the addition of
50 parts by weight of thiodiglycol or similar solvents based on glycol, and introduced into
500 parts by weight of a neutral starch-tragacanth thickening with the addition of
50 parts by weight of a neutral sodium chromate solution (1:2).

The mixture is made up with water to 1000 parts by weight.

After printing the fibre and subsequently drying, the print is developed with neutral steam for 5 to 10 minutes, boiled with soap, rinsed and dried. A bluish black is thus obtained of good fastness to light and very good fastness to wetting.

The diazoamino compound is obtainable by coupling diazotized p-nitraniline in an acid medium with 1-amino-2,5-dimethoxybenzene, further diazotizing the aminoazo dyestuff thus obtained at 40–45° C., combining the product in a weakly alkaline medium with 2-ethylamino-5-sulfobenzoic acid and isolating the reaction product in the manner described in Example 1.

*Example 4*

60 to 100 parts by weight of a mixture of equivalent parts of a diazoamino compound obtainable by reacting diazotized 4 - amino-2,5-dimethoxybenzene-(1,1')-azo-2'-chloro-4'-nitrobenzene with 2-ethylamino-5 - sulfobenzoic acid, and of 2,3-hydroxynapthoylaminobenzene are pasted with 50 parts by weight of alcohol, dissolved in
100 parts by volume of water,
5 to 15 parts by weight of sodium hydroxide solution 38° Bé.) with the addition of
50 parts by weight of thiodiglycol or similar solvents based on glycol, and introduced into
500 parts by weight of a neutral starch-tragananth thickener with the addition of
50 parts by weight of a neutral sodium chromate solution (1:2).

The mixture is made up with water to 1000 parts by weight. After printing, the material is dried, damped neutral for 5 to 10 minutes, boiled with soap, rinsed and finished. A neutral black is thus obtained of very good general fastness properties.

The diazoamino compound is obtainable similarly to the method described in Example 1.

*Example 5*

60 to 100 parts by weight of a mixture of equivalent parts of a diazoamino compound obtainable by coupling diazotized 4 - amino-2,5-dimethoxybenzene-(1,1')-azo-2',6'-dichloro-4'-acetylaminobenzene, with 2-ethylamino - 5 sulfobenzoic acid and subsequent saponification, and of 2,3-hydroxynaphthoylaminobenzene are pasted with 50 parts by weight of alcohol, and dissolved in
100 parts by volume of water,
5 to 15 parts by weight of sodium hydroxide solution 38° Bé.) with the addition of
50 parts by weight of thiodiglycol or similar solvents based on glycol, and introduced into
500 parts by weight of a neutral starch-tragacanth thickening.

The mixture is then made up with water to 1000 parts by weight. After printing and drying, the material is damped neutral for 5 to 10 minutes, boiled with soap, rinsed and finished. A deep somewhat bluish black is thus obtained of very good fastness to wetting.

The diazoamino compound used in this example is obtainable by diazotizing 1-acetylamino-3,5-dichloro - 4 aminobenzene in the usual manner and coupling in an acid medium with 1-amino-2,5-dimethoxybenzene, dissolving the isolated reaction product in sulfuric acid (60° Bé.), further diazotizing with nitrosyl sulfuric acid, pouring onto ice, combining the separated diazo-azo compound in a weakly alkaline medium with 2-ethylamino-5 sulfobenzoic acid, and saponifying the acetylamino group in the diazoamino compound thus obtained by heating in an aqueous caustic soda solution at 80° C. within 20 minutes. The saponification product isolated by salting out is a reddish brown powder which readily dissolves in water with an orange-brown color.

If in this example instead of the saponified diazoamino compound from 4-amino-2,5-dimethoxybenzene - (1,1') azo-2',6'-dichloro-4'-acetylamino-benzene and 2 - ethylamino-5-sulfobenzoic acid the diazo amino compounds shown in the following table are used prints are obtained on cotton and regenerated cellulose having the shades listed in the table.

Diazoamino compound from

| diazo component | stabilizer | shade |
|---|---|---|
| 1-diazo-2,5-dimethoxy-benzene-(4,1')-azo-4'-nitrobenzene. | 2-propylamino-5-sulfobenzoic acid. | black. |
| Do. | 2-butylamino-4-sulfobenzoic acid. | Do. |
| Do. | 2-β-hydroxy-ethylamino-5-sulfobenzoic acid. | Do. |
| Do. | 2-β-methoxy ethylamino-4-sulfobenzoic acid. | Do. |
| Do. | 2 - β - methylsulfonylethyl - amino-5-sulfobenzoic acid. | Do. |
| 1-diazonaphthalene-azo-(4,1')-2'-ethoxybenzene. | 2-ethylamino-5-sulfobenzoic acid. | covered violet. |
| 1-diazo-3-methoxy-4-methyl-benzene-(6,1')-azo-2'-chloro-4'-nitrobenzene. | ----do---- | brown. |
| 1-(p-diazophenyl)-3-methyl-5-pyrazolone-(4,1')-azo-2',6'-dichloro-4'-nitrobenzene. | ----do---- | red brown. |
| 4,4'-bis-(azo-2'',5''-dimethoxy-4''-diazobenzene-1'')-3,3'-dichloro-diphenyl. | ----do---- | grey blue. |

We claim:

1. Process for the manufacture of ice colors in textile printing which comprises applying a diazoamino compound which in the free acid state corresponds to the formula

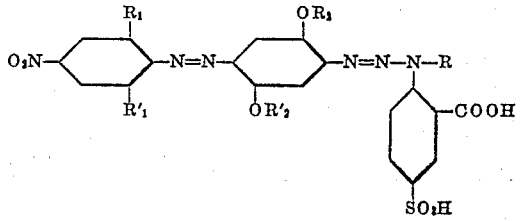

wherein R is a lower alkyl radical having 2 to 4 carbon atoms, $R_1$ and $R'_1$ are members selected from the group consisting of hydrogen and chlorine, $R_2$ and $R'_2$ are lower alkyl radicals, to a fibre together with an ice color coupling component, and developing resultant print by damping with neutral steam.

2. Process according to claim 1 wherein the diazoamino compound corresponds to the formula

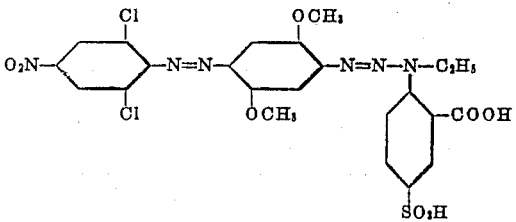

3. A composition for the manufacture of ice colors in textile printing which comprises a diazoamino compound which in the free acid state corresponds to the formula

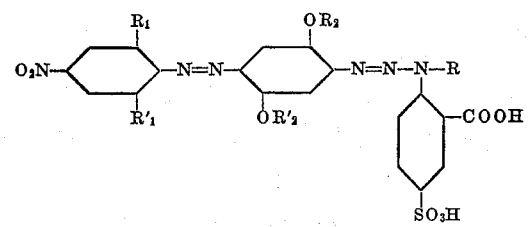

wherein R is a lower alkyl radical having 2 to 4 carbon atoms, $R_1$ and $R'_1$ are members selected from the group consisting of hydrogen and chlorine, $R_2$ and $R'_2$ are lower alkyl radicals.

4. A composition according to claim 3 wherein the diazoamino compound corresponds to the formula

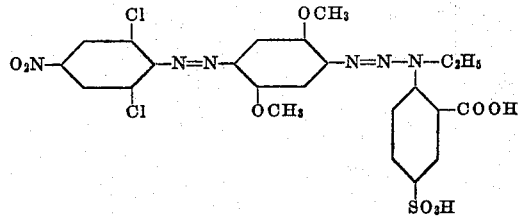

References Cited in the file of this patent
UNITED STATES PATENTS

| | | |
|---|---|---|
| 1,882,561 | Haller | Oct. 11, 1952 |
| 2,781,337 | Moser | Feb. 12, 1957 |
| 2,781,338 | Moser | Feb. 12, 1957 |